United States Patent [19]
Aksoy et al.

[11] Patent Number: 5,421,745
[45] Date of Patent: Jun. 6, 1995

[54] CONTACT ARRAY

[75] Inventors: Adnan Aksoy, Boca Raton; Mark S. Bresin, Coral Springs; Wille Kottke, Miami, all of Fla.

[73] Assignee: Motorola, Inc., Schaumburg, Ill.

[21] Appl. No.: 143,025

[22] Filed: Jan. 3, 1994

[51] Int. Cl.⁶ .............................................. H01M 2/34
[52] U.S. Cl. ...................................... 439/626; 429/7; 429/123; 439/500; 439/620
[58] Field of Search ............... 439/500, 626, 620, 929; 429/7, 96–100, 123, 62

[56] References Cited

U.S. PATENT DOCUMENTS 3,911,663  10/1975  Kern et al. ............................ 429/98
5,298,347   3/1994  Aksoy et al. ......................... 429/98
5,358,798  10/1994  Kleinert, III ........................... 429/7

Primary Examiner—Neil Abrams
Attorney, Agent, or Firm—Lesley A. Rhyne; Kenneth M. Massaroni

[57] ABSTRACT

A contact array (10) for electrically connecting an energy source (20) to a radio (12) and a charger comprising a circuit assembly (31) having a plurality of integral radio and charger contacts (38, 40) extending from one end of the circuit assembly (31). Two terminals (34) extend from a second end of the circuit assembly (32) for connecting to the energy source (20), and means for attaching (42) a component (44) to the top side (32) of the assembly (31). The means for attaching (42) are integral to the circuit assembly (31).

7 Claims, 4 Drawing Sheets

CONTACT ARRAY

FIELD OF THE INVENTION

This invention relates generally to contact arrays, and more specifically to a contact array for connecting an energy source to an electronic device and a charger.

BACKGROUND

Portable electronic devices such as two-way radios typically comprise a rechargeable energy source that is connected to the electronic device or a charger by a contact array. Typically the contact array comprises a flex assembly that includes a contact block, an insert molded part having both plastic and metal. The flex assembly further includes terminals or tabs to a battery cell pack. The tabs are sheet metal tabs which are spot welded to the flex assembly. The contact block and the tabs have to be manually assembled onto a flex circuit. The flex assembly then has to be manually assembled into an electronic product. The typical flex assembly is labor intensive. The method of manufacture for the flex assembly is wrought with inefficient assembly procedures and unnecessary parts and labor resulting in excessive manufacturing expense and compromised reliability.

The flex assembly may also include other components such as resistors, thermistors, diodes, connectors and other components that enable the battery packs to be rechargeable and/or intrinsically safe. However, whenever a multiple number of electrical parts are used in an electronic device, the electrical integrity or electrical loss between the connection members, the energy source and the circuitry is of concern.

The drive to reduce weight in electronic consumer products is now impacting all parts of the electronic design. Automated assembly as much as the drive to increase the ease of assembly or manufacturability demands that parts be integral and as compact as possible. Therefore, the ability to integrate features in less components and parts is critical in reducing the number of assembling steps. Therefore, a need exists for a contact array that provides the convenience of ease of assembly, provides for a reduction in weight, and allows for greater efficiency and reduced cost in assembly and manufacture. Furthermore, there is a need for a simple less expensive way to make connections between an energy source, an electronic device and a charger.

DETAILED DESCRIPTION OF THE PREFERRED EMBODIMENT

Figure 1:
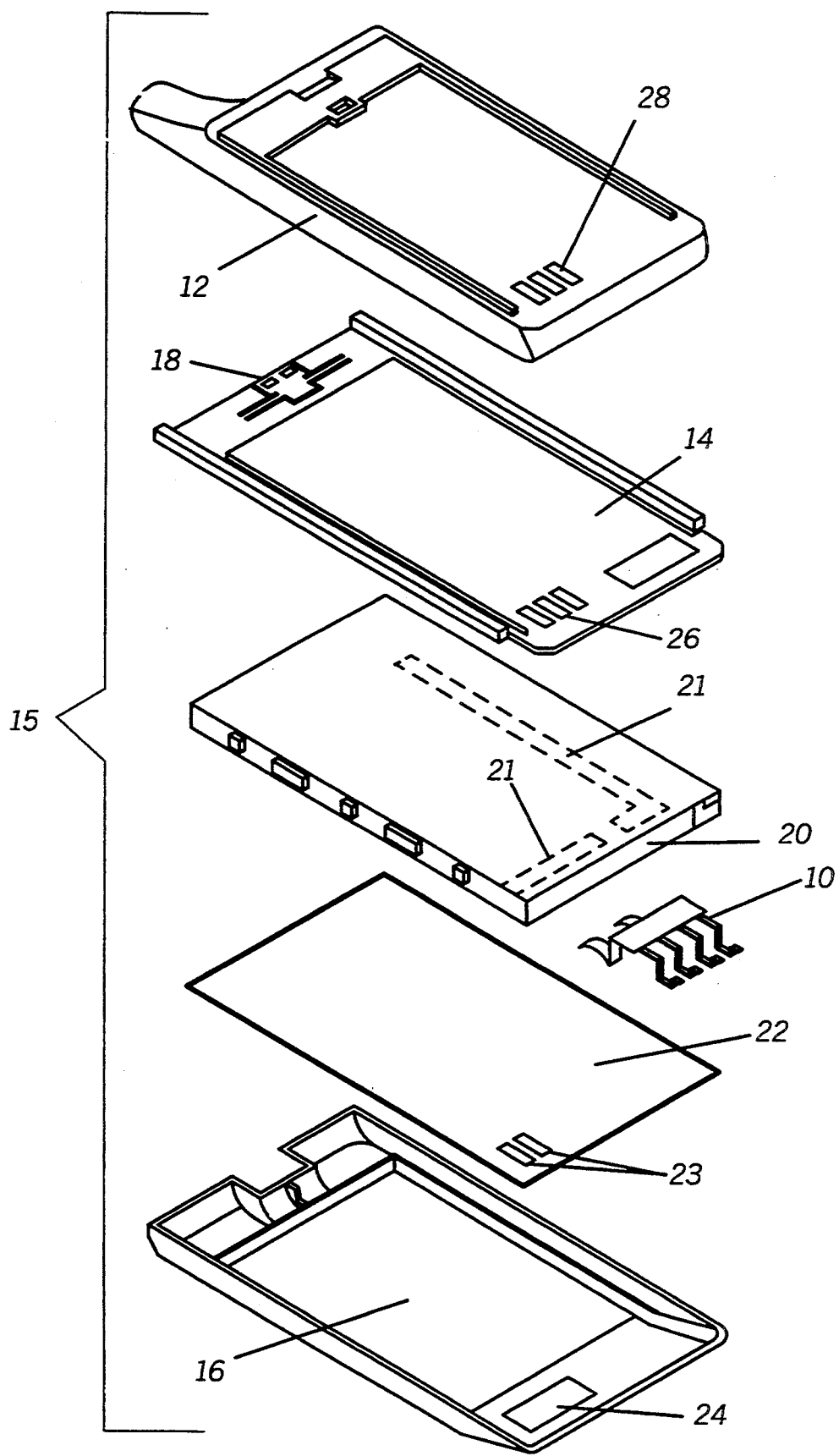
FIG. 1 is an exploded view of a radio assembly having a contact array according to a first embodiment of the present invention.

Referring to FIG. 1, there is shown an exploded view of a radio assembly having a connection member or contact array 10 according to the present invention. The radio assembly includes a radio body 12 and a removable battery package 15. The battery package 15 comprises a housing having a top portion 14 and a bottom portion 16. The housing portions are preferably constructed to snap together. Alternatively, the housing portions could be ultrasonically welded together. The top portion 14 includes a latch feature 18 that mates with the bottom portion 16 as well as the radio 12 to allow the detachable coupling of the battery pack 15 to the radio 12. The top portion 14 also includes a battery radio interface 26 for allowing electrical connection to be made to radio battery contacts 28 on the radio 12. The bottom portion 16 includes a battery charger interface 24 for allowing connection to a charger (not shown).

The battery package 15 further includes a battery cell pack 20 disposed between the top portion 14 and the bottom portion 16 of the battery package 15. An adhesive 22 may be used to attach the battery cell pack 20 to the bottom portion 16. The adhesive 22 keeps the cell pack 20 from moving or slipping within the battery housing. There are two cut out sections 23 in the adhesive 22. A contact array 10 is placed between the top portion 14 and the cell pack 20 but with having extension legs that extend under the cell pack 20 to make contact to terminal lines 21 of the cell pack (shown in phantom). The electrical connections may be reliably kept in place by placing the adhesive 22 so that it substantially covers a side of the battery cell pack 20.

Figure 2:
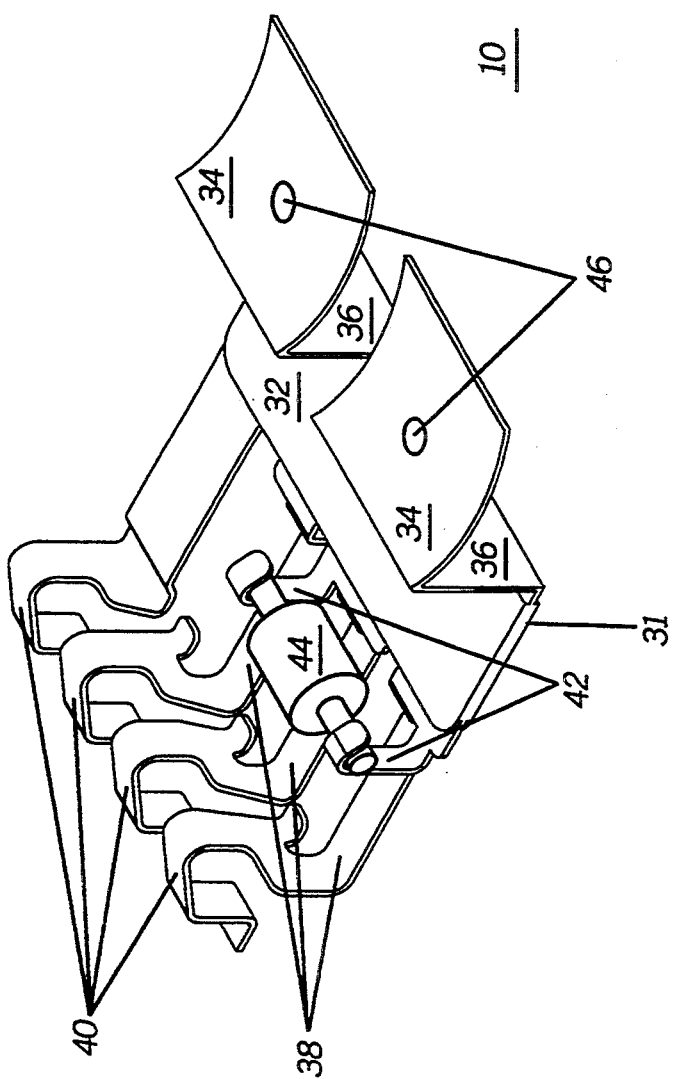
FIG. 2 is a isometric view of the contact array of FIG. 1.

Referring to FIG. 2, there is shown an isometric view of the contact array 10 of FIG. 1. The contact array 10 includes a circuit assembly having a top side 32 and four ends. There are a plurality of integral radio and charger contacts 38, 40 extending from one end of the circuit assembly 31. The radio contacts 38 are for connecting to contacts 28 on the radio 12 through the battery radio interface 26 on the top portion 14 of the battery package 15 (shown in FIG. 1). The charger contacts 40 are for connecting to a charger (not shown) through the battery charger interface 24 on the bottom portion 16 of the battery package 15.

There are two extension members 36 extending substantially perpendicularly from a second end of the circuit assembly 31. A terminal 34 extends perpendicularly from each extension member 36. The terminals 34 are for connecting to terminal straps (or lines) 21 of the battery cell pack 20 (shown in phantom in FIG. 1). The extension members 36 allow the terminals 34 to connect to the terminal straps 21 on an opposite side of the cell pack 20 from where the contact array 10 is placed. The terminals 34 may include pressure contacts and may further include dimples 46 in each contact. The terminals 34 are located inside the two cut out sections 23 and are sealed from any corrosive environment when they are compressed between the cell pack 20 and bottom portion 16. Thus, the useful life of the battery package 15 may be prolonged.

The circuit assembly 31 further includes attachment means 42 extending from the circuit assembly 31 for attaching a component 44 to the top side of the circuit assembly 31. The attachment means may be a hook extension 42 that would allow a component such as a thermistor 44 to be simply snapped and retained by the attachment means 42.

The contact array 10 may be formed from a stamped metal circuit that is shaped into a three dimensional circuit assembly 31. Components may be held in place on the circuit assembly by crimping, soldering, or any other fastening method known in the art. The complete circuit assembly 31 may be provided in a tape and reel, reel-to-reel, or in trays to be placed conveniently within a battery package 15 during automated assembly.

Figure 3:
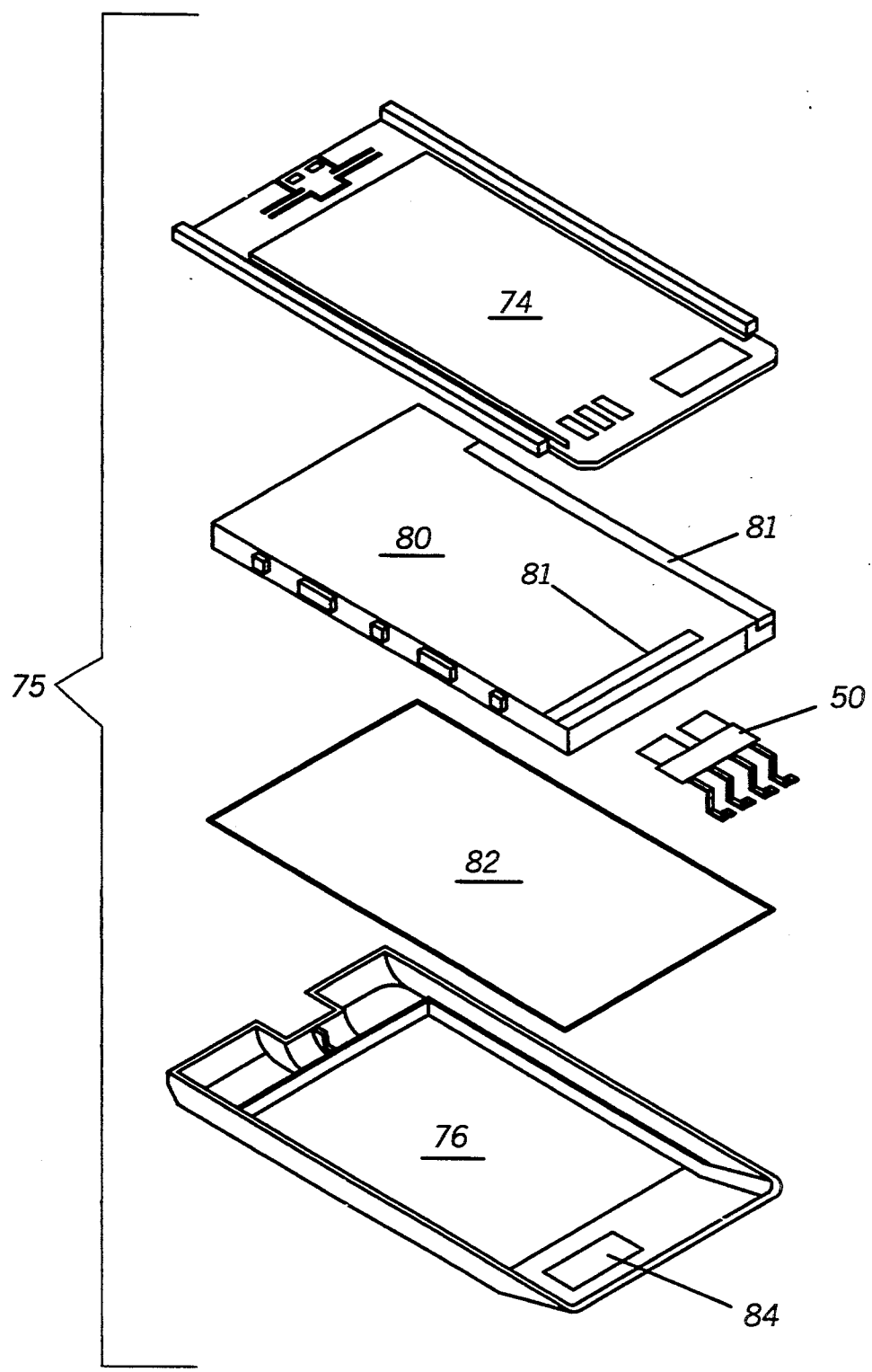
FIG. 3 is an exploded view of a battery assembly having a contact array according to a second embodiment of the present invention.

Referring to FIG. 3, an exploded view of a battery assembly having a contact array according to a second embodiment of the present invention is shown. Similarly, a battery package 75 includes a bottom portion 76 having a battery charger interface 84 for allowing battery connection to a charger (not shown). A layer of adhesive 82 properly secures a battery cell pack 80 to the bottom portion 76. A contact array 50 connects the battery cell pack 80 via terminal straps (or lines) 81 to an electronic device such as a radio (not shown) as well as to a charger (not shown) when needed. A top portion 74 includes a battery radio interface 86 to allow the contact array 50 to access contacts on the radio. The top portion 74 mates with the bottom portion 76 enclosing the cell pack 80 and forming the battery package 75. The housing portions are preferably constructed to snap together. Alternatively, the housing portions could be ultrasonically welded together. The battery package detachably couples with the radio.

Figure 4:
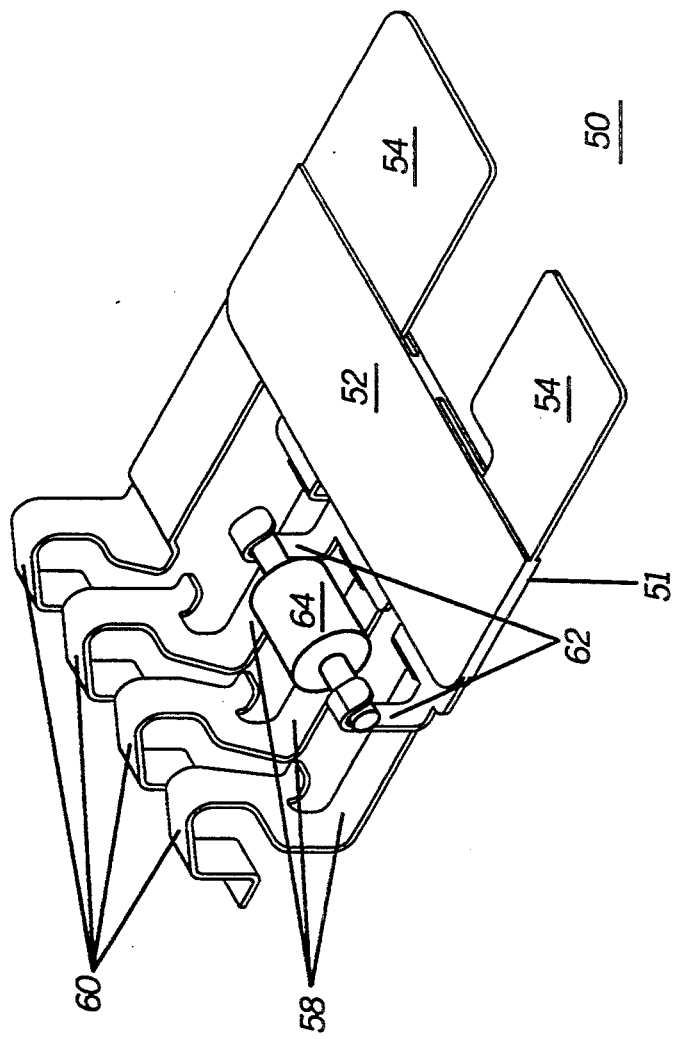
FIG. 4 is a isometric view of the contact array of FIG. 3.

Referring to FIG. 4, an isometric view of the contact array 50 of FIG. 3 is shown. The contact array 50 is similar to the contact array of FIG. 2. The contact array includes a circuit assembly 51 having a top side 52 and four ends. There are a plurality of integral radio and charger contacts 58, 60 extending from one end of the circuit assembly 52. The radio contacts 58 are for connecting to contacts on the radio (not shown) through the battery radio interface 86 on the top portion 74 of the battery package 75 (shown in FIG. 3). The charger contacts 60 are for connecting to a charger (not shown) through the battery charger interface 84 on the bottom portion 76 of the battery package 75.

There are two terminals 54 extending from a second end, opposite to the first end. The terminals 54 are for connecting to terminal straps (or lines) 81 of the cell pack 80 of FIG. 3. The adhesive 82 may be placed over the terminals 54 to limit direct environment interaction, especially corrosive environments, such as marine use. Thus, the useful life of the battery package 15 may be prolonged.

The circuit assembly 51 further includes attachment means 62 extending from the circuit assembly 51 for attaching a component 64 to the top side of the circuit assembly 51. The attachment means may be hook extensions 62 that would allow a component such as a thermistor 64 to be simply snapped and retained by the attachment means 62.

In summary, a contact array is provided that is easier to manufacture and assemble due to the lower number of parts resulting in a lower cost. The contact array may also be used in harsh environments due to the environmentally protected construction.

While the invention has been particularly shown and described with reference to several preferred embodiments thereof, it will be understood by those skilled in the art that various changes in form and detail may be made without departing from the spirit or scope of the invention.

What is claimed is:

1. A battery pack having a connection member for connecting to an electronic device and a charger, said connection member comprising:
    a circuit assembly having a top side and four ends;
    a plurality of integral radio and charger contacts extending from one end of the circuit assembly;
    two terminals extending from a second end of the circuit assembly for connecting to an energy source said two terminals comprising spring member pressure contacts extending from a top side of the terminals
    means for attaching a component to the top side of the circuit assembly.

2. The radio of claim 1 wherein each spring member comprises a dimple.

3. The radio of claim 1 wherein terminals are covered on one side with an adhesive layer.

4. The radio of claim 1 wherein the terminals comprise extension members that extend perpendicularly from the second end of the circuit assembly.

5. A contact array for electrically connecting an energy source to a radio and a charger comprising:
    a circuit assembly having a top side and four ends;
    a plurality of integral radio and charger contacts extending from one end of the circuit carrier;
    two extension members extending perpendicularly from a second end of the circuit assembly;
    terminals extending from each extension member for connecting to the energy source, said terminals comprising two pressure contacts extending from a top side of the terminals;
    an adhesive layer covering the top side of the terminals;
    means for attaching a component to the top side of the assembly, said means for attaching being integral to the circuit assembly.

6. The contact array of claim 5 wherein each pressure contact comprises a spring member.

7. The contact array of claim 6 wherein each spring member comprises a dimple.

* * * * *